US012565027B2

(12) United States Patent (10) Patent No.: US 12,565,027 B2
Martin et al. (45) Date of Patent: Mar. 3, 2026

(54) RECYCLABLE MULTILAYER PACKAGING MATERIAL

(71) Applicant: CONSTANTIA TOBEPAL S.L.U., Logroño (ES)

(72) Inventors: Roberto Martin, Logroño (ES); Angela Romero, Logroño (ES); Ivan Leon, Logroño (ES); Ramon Aguado, Logroño (ES); Joerg Adrian, Logroño (ES)

(73) Assignee: CONSTANTIA TOBEPAL S.L.U., Logroño (ES)

( * ) Notice: Subject to any disclaimer, the term of this patent is extended or adjusted under 35 U.S.C. 154(b) by 403 days.

(21) Appl. No.: 18/022,405

(22) PCT Filed: Jul. 21, 2021

(86) PCT No.: PCT/EP2021/070461
§ 371 (c)(1),
(2) Date: Feb. 21, 2023

(87) PCT Pub. No.: WO2022/037891
PCT Pub. Date: Feb. 24, 2022

(65) Prior Publication Data
US 2023/0339218 A1 Oct. 26, 2023

(30) Foreign Application Priority Data

Aug. 21, 2020 (EP) ..................................... 20192280

(51) Int. Cl.
| | |
|---|---|
| *B32B 27/08* | (2006.01) |
| *B32B 1/08* | (2006.01) |
| *B32B 7/12* | (2006.01) |
| *B32B 27/32* | (2006.01) |
| *B32B 37/12* | (2006.01) |
| *B65D 65/40* | (2006.01) |

(52) U.S. Cl.
CPC ............... *B32B 27/08* (2013.01); *B32B 1/08* (2013.01); *B32B 7/12* (2013.01); *B32B 27/32* (2013.01); *B32B 37/12* (2013.01); *B65D 65/40* (2013.01); *B32B 2250/03* (2013.01); *B32B 2250/242* (2013.01); *B32B 2255/10* (2013.01); *B32B 2255/205* (2013.01); *B32B 2307/31* (2013.01); *B32B 2307/412* (2013.01); *B32B 2307/518* (2013.01); *B32B 2307/7244* (2013.01); *B32B 2307/7246* (2013.01); *B32B*

*2307/75* (2013.01); *B32B 2323/10* (2013.01); *B32B 2439/40* (2013.01); *B32B 2439/70* (2013.01); *B32B 2439/80* (2013.01)

(58) Field of Classification Search
CPC .. B32B 27/08; B32B 1/08; B32B 7/12; B32B 27/32; B32B 37/12; B32B 2250/03; B32B 2250/242; B32B 2255/10; B32B 2255/205; B32B 2307/31; B32B 2307/412; B32B 2307/518; B32B 2307/7244; B32B 2307/7246; B32B 2307/75; B32B 2323/10; B32B 2439/40; B32B 2439/70; B32B 2439/80; B32B 2250/04; B32B 2307/714; B65D 65/40
See application file for complete search history.

(56) References Cited

U.S. PATENT DOCUMENTS

| | | | |
|---|---|---|---|
| 2009/0010809 A1 | 1/2009 | Hadjis et al. | ............. B01L 3/02 |
| 2019/0270288 A1* | 9/2019 | Dabadie | ................. B32B 27/34 |

FOREIGN PATENT DOCUMENTS

| | | | |
|---|---|---|---|
| BR | 102014030333 | 9/2016 | ............. B32B 27/32 |
| CN | 107010316 | 8/2017 | ............. B65D 65/40 |
| DE | 202013005243 | 8/2013 | ............. B65D 85/78 |
| WO | WO2020120502 | 6/2020 | ............. B32B 5/14 |

OTHER PUBLICATIONS

English machine translation for CN207291200. (Year: 2018).*
European Search Report issued in European Patent Appln. Serial No. 20192280.4, dated Feb. 4, 2021, 6 pages.
PCT International Search Report, Written Opinion and International Preliminary Report on Patentability issued in PCT International Application Serial No. PCT/EP2021/070461, dated Aug. 19, 2021, 16 pages.

* cited by examiner

*Primary Examiner* — Michael C Miggins
(74) *Attorney, Agent, or Firm* — HAYES SOLOWAY P.C.

(57) ABSTRACT

Disclosed is a HCR (High Chemical Resistant) recyclable multilayer packaging material includes a plurality of polypropylene containing layers, wherein at least one of the polypropylene containing layers is bond to two neighbouring layers by different adhesives as well as to a packaging comprising such a recyclable multilayer packaging material. Also disclosed is a method for manufacturing a recyclable multilayer packaging material and a flexible packaging from the recyclable multilayer packaging material.

20 Claims, No Drawings

RECYCLABLE MULTILAYER PACKAGING MATERIAL

BACKGROUND OF THE INVENTION

The present invention is directed to a HCR (High Chemical Resistant) recyclable multilayer packaging material and a method for producing the same and also the use of this recyclable multilayer packaging material.

Multilayer packaging materials are known from the state of the art and are used for different purposes, for example to close containers or the like. Recently sustainable and in particular recyclable laminates are now under a strong focus as every day approximately 8 Million pieces of plastic pollutions find their way into our oceans. There may be around 5.25 Trillion macro and micro plastic pieces floating in the open ocean.

Plastic consistently makes up 60 to 90 percent of all marine debris studied. 40 percent of plastic produced is packaging used just once and is then discarded.

US 2009108019 discloses a thermal laminate packaging suitable for retaining cool temperatures with an outer layer being a bi axially oriented polypropylene. DE 20 2013 005 243 U1 describes an air tight packaging for ice made of a thermoplastic material. BR102014030333A2 describes a laminate structure containing Polypropylene.

It has been found out in different stability studies with HPC (Home & Personal Care)—creams and chemically aggressive pharmaceutical products and simulants that these materials are not suitable for this type of application as such materials suffer from delamination observed during accelerated ageing tests. The results of stability studies using other monomaterials (e.g. mono PE) were similar to the ones found for the PP-based materials disclosed in the literature so far.

No monomaterial (e.g. mono-PE or mono-PP) structures with High Chemical resistance (HCR) have been described in the state of the art. A comparison of the chemical resistance of different mono-material solutions vs the object of the present invention is shown in Example 1.

It is therefore object of the present invention to provide a packaging monomaterial ready to be recycled and with improved chemical resistance towards aggressive filling goods.

DETAILED DESCRIPTION OF THE INVENTION

The invention is therefore directed to a recyclable multilayer packaging material comprising a plurality of polypropylene containing layers. According to the invention at least one of the polypropylene-containing layers is bonded to two neighbouring layers by different adhesives.

The term "recyclable" in the context of the present invention refers to a product which could after its intentional usage be treated in a simple manner to recover a high percentage of its materials for further usage. Such a simple treatment usually excludes separation of different main components of the product, which have to be handled separately. Preferably the product comprises a single first material in an amount of ≥75%, preferably, ≥80%, preferably, ≥90%, preferably, ≥95%, more preferably, ≥98%, most preferably, ≥99% or even ≥99.8%. The rest of the product comprises preferably only a low number, preferably only a single second material. Preferably, the product does not contain Paper nor Aluminium foil nor foamed thermoplastic non-polyolefin elastomers. Furthermore, pigments of black and other dark colours are preferably not present. Most preferably, a product is considered to be "recyclable" in the context of the present invention, if it fulfills all the requirements as outlined to be "Compatible with PE or PP mechanical recycling" in the guidelines (Phase-1-Guidelines-Summary-Table-June-2020) published by the value chain collaboration "Circular Economy for Flexible Packaging" ((CEFLEX) www.ceflex.eu).

As outlined in the above-mentioned guidelines a polymer of a single (first and/or second) material should be understood to be chemically based on the same monomer or monomers.

However, the physical properties of different layers of this material could be different, e.g. due to a different molecular weight, network structure, chain length, degree of cross-linking, thermal treatment, layer thickness, mono or multi directional stretching and others. Preferably the at least in one chemical or physical property of the second material differs with respect to the first material to allow easy separation of these materials. Accordingly, the guidelines pro-pose mono-PP including co-extruded, orientated, co-polymers, laminated PP/PP with or without barrier layers and coatings Furthermore, the above-mentioned guidelines allow barrier layers and coatings as long as they do not exceed a maximum of 5% of the total packaging structure weight. Suitable materials included in such a barrier layer are AlOx, SiOx, EVOH, PVOH and/or Acrylic as well as laminated and printed metallised layers. Also, some adhesives are allowed by the above-mentioned guidelines. The allowed materials include polyurethane, acrylic or natural rubber latex adhesives, as well as non-PE or non-PP based tie-layers, unless they do not exceed a maximum of 5% by weight of the total packaging structure.

It is suggested, that preferably the at least one polypropylene containing layer is bonded to a first neighbouring layer by a first adhesive and on a first surface of the propylene layer and to a second neighbouring layer via a second surface by a second adhesive. Therefore, the polypropylene containing layer is preferably sandwiched between two different adhesives. More preferably one of the two different adhesives is selected from an adhesive containing a material selected from the group comprising polyurethane, acrylic or natural rubber latex, non-PE or non-PP based tie-layers, wherein the amount of this adhesive is 5% or less (by weight) of the total packaging.

Preferably at least one of the polypropylene containing layers is bonded by a full surface adhesive layer to the first neighbouring layer and/or by a second full surface adhesive layer to the second neighbouring layer.

It was found that monomaterials described in the state of the art (mainly mono-PE and mono-PP) are not able to withstand aggressive components. However, it had been found, that the best choice to fulfill the requirements of the invention would be PP (polypropylene). Polypropylene has several advantages. One advantage is that polypropylene is being used in the flexible packaging industry for several decades and especially both, in pharma- and also consumer applications. Therefore, there is already great experience in handling polypropylene.

Furthermore, polypropylene films have already an existing in supply chain in the European market and all over the world. Therefore, admissibility procedures will be easier to be over-come with this material.

Also, metalized grades with superior WVTR (Water Vapor Transmission Rate) are available in the market. There are even versions with very good OTR (Oxygen transmission rate).

In a preferred embodiment at least three polypropylene containing layers are used, which are preferably different with respect to each other. Preferably at least one of these layers is different with respect to another layer. In another preferred embodiment all the layers are different with respect to each other. It is therefore understood, that these layers differ from each other in at least one physical parameter such as WVTR, OTR, layer thickness, molecular weight, network structure, chain length, degree of cross-linking, mono or multi directional stretching, mono or multi directional strength, fat resistance, fat permeability, printability and others. Preferably these layers include at least one, preferably two, more preferably three layers selected from a group comprising a printing support layer, a barrier layer and a sealing layer.

The inventors found out, that a full PP-specimen manufactured by adhesive lamination and the stability results against aggressive filling goods are similar compared to high barrier PE-mono-material laminates manufactured by adhesive lamination. So far, no mono-PE material is known that provides sufficient barrier properties combined with high bond strength and chemical resistance. When trying to move to an extrusion lamination specimen it was found difficult to extrude a PP-resin over a metallized film with sufficient bond strength. For some combinations of PP and metallic surfaces, it has been found advantageous increasing the bond strength by modifying the PP resin by adding maleic anhydride or a primer. For some combinations of PP and metallic surfaces it has been found advantageous to extend the drying period, preferably by using long drying tunnels.

Therefore, in one preferred aspect of the invention PP layers are extruded over the metallized side of metBOPP (metalized Biaxially Oriented Poly-Propylene), preferably by using adhesive lamination on the metallized side and an extrusion lamination on the non-metalized side of the met-BOPP. The chemical resistance the resulting product was compared with a high barrier PE-monomaterial laminate manufactured by extrusion lamination. It was found that the obtained product provides an even higher chemical resistance.

Therefore, the mentioned embodiment suggests, that several, preferably at least two and preferably at least three layers are present.

In another preferred embodiment all layers of the recyclable multilayer packaging material are polypropylene containing layers, which are preferably bonded to at least one neighbouring layer by an adhesive.

As mentioned above, the adhesives are different to each other. This means, that the adhesives differ from each other in at least one parameter, especially a parameter selected from a group of parameters which contains chemical composition, application technology, bonding strength, WVTR, OTR, layer thickness, molecular weight, network structure, chain length, degree of cross-linking and hydrophobicity. In this context the term "adhesive" should be understood as any bonding agent. Such a bonding agenda includes resins. Preferably, at least one adhesive is a resin. More preferably this adhesive is a PP-based resin.

In another preferred embodiment at least one adhesive of the recyclable multilayer packaging material contains polypropylene and/or at least one adhesive of the recyclable multilayer packaging is selected from a group comprising polyurethane, acrylic based adhesives, water based adhesives and solvent-based adhesives. Therefore, in this embodiment the adhesives differ from each other at least in its chemical composition, as one of them contains polypropylene and another one contains polyurethane. The different chemical composition also results in different physical properties of the different adhesives, preferably selected from a group comprising contains chemical composition, bonding strength, WVTR, OTR, layer thickness, molecular weight, network structure, chain length, degree of cross-linking and hydrophobicity.

In another very preferred embodiment at least one layer, preferably at least two layers, comprise biaxially oriented polypropylene (BOPP). It has been found that a BOPP layer not only increases the strength and clarity of the respective layer with respect to not oriented (Cast Polypropylen, "CPP") or only unidirectional (Oriented Polypropylene, "OPP") stretched poly-propylene but the entire laminate. Due to the increased strength this layer is preferably an outer layer of the compound, and more preferably also the base film of the barrier layer.

In another preferred embodiment at least one layer comprises a metallized polymer, preferably met BOPP. This layer was found to be especially advantageous to reduce the WVTR and/or OTR of the laminate. Also, the opacity and/or reflective properties of the laminate could be increased by such a layer. The metalized layer preferably comprises a coating comprising a metal and/or a metal oxide. Preferably the coating comprises Al and/or Si. In the case a metal and/or a metalloid oxide is chosen AlOx and/or SiOx are especially preferred. Layers of AlOx or SiOx are preferred at least for some particular applications since they are transparent. However, depending on the desired properties also other metal or metal oxide barrier layers in thicknesses of nanometers, which do not harm recycling could be used.

In another very preferred embodiment at least one layer is a sealable PP cast or blown film comprises cast polypropylene (CPP). It has been found that a layer comprising CPP usually provides a high transparency and the required sealablity. Preferably the layer comprises cast polypropylene (CPP).

In another very preferred embodiment at least one layer comprises metallized polymer and another layer comprises cast polypropylene.

In another preferred embodiment the layer comprising cast polypropylene is bonded to at least one neighbouring layer by a polypropylene resin. Preferably the layer comprising cast propylene is bonded to exactly one neighbouring layer by a polypropylene resin. Thus, the layer comprising cast polypropylene is an outer layer of the laminate and the high rigidity and abrasion resistance of this layer protect the entire laminate at least from these types of physical stress.

The following invention is furthermore directed to a packaging, which is characterized by a recyclable multilayer packaging material as described above. Preferably, such a packaging is selected from a group comprising stick packs, strip-packs, sachets, tubes, stand-up-pouches, pillow bags and flow-packs/over-wraps.

In a preferred embodiment the packaging is used for packaging goods as pharmaceutical products, pastes, liquids, food products, beverages, and the like.

In another preferred embodiment a polypropylene containing adhesive of the multilayer pack-age material is arranged closer to an internal volume of the packaging than a polyurethane containing adhesive. Therefore, the polypropylene layer is preferably closer to the good to be packed than the polyurethane containing adhesive.

The above-described packaging material is therefore preferably a five-layer laminate containing as a first layer BOPP (preferably having a thickness from 40 to 15 μm), followed by an adhesive, followed by metallized BOPP (preferably having a thickness from 40 to 15 μm), followed again by an adhesive layer, preferably a layer of extruded polypropylene (preferably in an amount of 35 g/m² to 10 g/m²) and finally by a covering CPP-film (preferably having a thickness from 50 to 15 μm).

It has been found that compared with other mono materials the here described laminate dis-plays an unexpected high chemical resistance (mono material HCR-laminate). This is, as could be found, especially achieved by combining lamination technologies, i.e. adhesive and extrusion, and polypropylene as a basis of the laminate.

On top of that, this laminate has been designed in a way that does not significantly alter process-ability as working with PP-films is quite common in the flexible packaging industry. The invention is therefore in an advanced stage and can be industrialized. Furthermore, meeting the regulatory standards full PP laminate is feasible for being manufactured at high volumes and high production speeds.

Therefore, preferably the adhesives connecting the layers are a film of an adhesive and/or an extruded polymer applied to at least one of the neighboring layers.

The following invention is furthermore directed to a method for manufacturing recyclable multilayer packaging materials with the following steps providing a first polypropylene containing layer,
providing a second polypropylene containing layer,
providing a third polypropylene containing layer,
optionally providing one or more further polypropylene containing layers.

In a further step the first and third polypropylene containing layers are adhered to the second polypropylene containing layer with two different adhesives and/or by using different adhering processes.

Preferably at least the first polypropylene containing layer is printable. Thus, this layer is preferably used as printing support.

Preferably at least the second polypropylene containing layer provides barrier properties for at least one substance or radiation which could harm a product to be protected by the packaging. Thus, this layer is preferably used as barrier layer.

Preferably at least the third polypropylene containing layer provides sealing properties. Preferably this layer could be activated by (preferably local) application of energy, e.g. heat, pressure, radiofrequency, high frequency, ultrasonic vibration and combinations thereof. Thus, this layer is preferably used as a sealing medium.

Preferably one of the two different adhesives is a polypropylene containing adhesive preferably a polypropylene resin. Preferably this adhesive's polypropylene resin is extruded on a surface of one of the layers to be adhered by this adhesive. Preferably the resin is extruded on a surface of the third polypropylene containing layer.

In a further preferred embodiment of the method a first layer is stretched (preferably biaxially), preferably at least two layers are stretched biaxially to obtain layers of biaxially oriented polypropylene (BOPP).

In further a step, a flexible packaging is formed from the recyclable multilayer packaging material, wherein the packaging is preferable selected from a group stick packs, strip-packs, sachets, tubes, stand-up-pouches, pillow bags and flow-packs/over-wraps.

The following invention is further directed to the use of a recyclable multilayer packaging material of the above described kind for packing a good, wherein the good is preferably selected from a group comprising a pharmaceutical product, a home and personal care product, an aggressive filling good, a liquid, a base, an acid, an alcohol, ethanol, methanol, a gel, a suspension, a nutrient, a food product, a beverage and tooth paste.

It will be understood that the embodiments explained above are merely a first embodiment of the method and/or system of the invention. In this respect, the disclosure of the invention is not limited to these embodiments.

All the features disclosed in the application documents are claimed as being essential to the invention in so far as they are individually or in combination novel over the prior art.

Working Examples

Example 1.—Comparison of the HCR Resistance
of Mono PE Manufactured by Extrusion
Lamination vs Mono-PP Manufactured Using
Adhesive+Extrusion Lamination In order to determine the chemical resistance of the monomaterials, the bond strength between layers was measured during an accelerated ageing test (up to 90 days) with different aggressive products. Accelerated ageing conditions used in the tests were 45° C. and R.H=50%.

A bond strength threshold of 3 N/15 mm is considered to be OK (enough bond strength to guarantee material integrity). A bong strength below 3 N/15 mm is considered NOK (bond strength not enough to guarantee material integrity=delamination)

TABLE 1

Bond strengths measured between the different layers of a mono PP material manufactured using PU-based adhesives.

| Mono PP manufactured using PU-based adhesives | Layers | BOND STRENGTH (N. 15/mm) Days | | | | | | Product |
|---|---|---|---|---|---|---|---|---|
| | | 0 DAYS | 7 DAYS | 14 DAYS | 30 DAYS | 60 DAYS | 90 DAYS | |
| LAYER 1 = PRINTING SUPPORT | LAYER 1 @ LAYER 2 | OK | OK | OK | OK | OK | OK | Aggresive |
| | LAYER 2 @ LAYER 3 | OK | NOK | NOK | NOK | NOK | NOK | product 1 |
| LAYER 2 = BARRIER LAYER | LAYER 1 @ LAYER 2 | OK | OK | OK | OK | OK | OK | Aggresive |
| | LAYER 2 @ LAYER 3 | OK | NOK | NOK | NOK | NOK | NOK | product 2 |
| LAYER 3 = SEALING LAYER | LAYER 1 @ LAYER 2 | OK | OK | OK | OK | OK | OK | Aggresive |
| | LAYER 2 @ LAYER 3 | OK | NOK | NOK | NOK | NOK | NOK | product 3 |

TABLE 2

Bond strengths measured between the different layers of a mono PE material manufactured using extrusion lamination.

| Mono PE manufactured by extrusion lamination | Layers | BOND STRENGTH (N. 15/mm) Days | | | | | | Product |
|---|---|---|---|---|---|---|---|---|
| | | 0 DAYS | 7 DAYS | 14 DAYS | 30 DAYS | 60 DAYS | 90 DAYS | |
| LAYER 1 = PRINTING SUPPORT | LAYER 1 @ LAYER 2 | OK | NOK | NOK | NOK | NOK | NOK | Aggresive |
| | LAYER 2 @ LAYER 3 | OK | OK | OK | OK | OK | OK | product 1 |
| LAYER 2 = BARRIER LAYER | LAYER 1 @ LAYER 2 | OK | NOK | NOK | NOK | NOK | NOK | Aggresive |
| | LAYER 2 @ LAYER 3 | OK | OK | OK | OK | OK | OK | product 2 |
| LAYER 3 = SEALING LAYER | LAYER 1 @ LAYER 2 | OK | NOK | NOK | NOK | NOK | NOK | Aggresive |
| | LAYER 2 @ LAYER 3 | OK | OK | OK | OK | OK | OK | product 3 |

TABLE 3

Bond strengths measured between the different layers of a mono PP material manufactured using PU-based adhesive + extrusion lamination

| Mono PP manufactured by adhesive + extrusion lamination | Layers | BOND STRENGTH (N. 15/mm) Days | | | | | | Product |
|---|---|---|---|---|---|---|---|---|
| | | 0 DAYS | 7 DAYS | 14 DAYS | 30 DAYS | 60 DAYS | 90 DAYS | |
| LAYER 1 = PRINTING SUPPORT | LAYER 1 @ LAYER 2 | OK | OK | OK | OK | OK | OK | Aggresive |
| | LAYER 2 @ LAYER 3 | OK | OK | OK | OK | OK | OK | product 1 |
| LAYER 2 = BARRIER LAYER | LAYER 1 @ LAYER 2 | OK | OK | OK | OK | OK | OK | Aggresive |
| | LAYER 2 @ LAYER 3 | OK | OK | OK | OK | OK | OK | product 2 |
| LAYER 3 = SEALING LAYER | LAYER 1 @ LAYER 2 | OK | OK | OK | OK | OK | OK | Aggresive |
| | LAYER 2 @ LAYER 3 | OK | OK | OK | OK | OK | OK | product 3 |

As it can be seen from the bond strength results only the combination of adhesive+extrusion lamination in the mono PP material was able to withstand the chemical ageing with the 3 selected aggressive products.

The invention claimed is:

1. A recyclable multilayer packaging material comprising a plurality of polypropylene containing layers, wherein at least one of the polypropylene containing layers is bond to two neighbouring poly propylene polypropylene containing layers by different adhesives, wherein at least two of said layers comprise biaxially oriented polypropylene (BOPP).

2. The recyclable multilayer packaging material according to claim 1, wherein the recyclable multilayer packaging material comprises at least three polypropylene containing layers, which are different with respect to each other.

3. The recyclable multilayer packaging material according to claim 1, wherein at least one layer comprises a metallized polymer and/or a coated polymer comprising AlOx and/or SiOx.

4. The recyclable multilayer packaging material according to claim 1, wherein one of the two different adhesives is selected from an adhesive containing a material selected from the group comprising polyurethane, acrylic or natural rubber latex, non-PE or non-PP based tie-layers, wherein the amount of this adhesive is 5% or less (by weight) of the total packaging.

5. The recyclable multilayer packaging material according to claim 1, wherein the adhesives differ from each other in at least one parameter, wherein the at least one parameter selected from a group of parameters which contains chemical composition, application technology, bonding strength, WVTR, OTR, layer thickness, molecular weight, network structure, chain length, degree of cross-linking and hydrophobicity.

6. The recyclable multilayer packaging material according to claim 1, wherein the adhesives differ from each other at least in its chemical composition, as one of them contains polypropylene and another one contains polyurethane.

7. The recyclable multilayer packaging material according to claim 1, wherein at least one layer comprises metallized polymer and another layer comprises cast polypropylene.

8. The recyclable multilayer packaging material according to claim 1, wherein all layers of the recyclable multilayer packaging material are polypropylene containing layers, which are bond to at least one neighbouring layer by an adhesive.

9. The recyclable multilayer packaging material according to claim 8, wherein at least one adhesive of the recyclable multilayer packaging material contains poly-propylene and/or at least one adhesive of the recyclable multilayer packaging material is selected from a group comprising a polyurethane, an acrylic based adhesive, a water based adhesive and a solvent-based adhesive.

10. The recyclable multilayer packaging material according to claim 1, wherein at least one layer comprises cast polypropylene.

11. The recyclable multilayer packaging material according to claim 10, wherein the layer comprising cast polypropylene is bond to a neighbouring layer by a polypropylene resin.

12. The recyclable multilayer packaging material according to claim 10, wherein the layer comprising cast polypropylene is bonded to exactly one neighboring layer by a polypropylene resin.

13. The recyclable multilayer packaging material according to claim 10, wherein the layer comprising cast polypropylene is an outer layer of the laminate and the high rigidity and abrasion resistance of this layer protect the entire laminate at least form these type of physical stress.

14. A packaging, comprising a recyclable multilayer packaging material according to claim 1.

15. A packaging according to claim 14, wherein a polypropylene containing adhesive of the multilayer packaging material is arranged closer to an internal volume of the packaging than an adhesive selected from a group comprising a polyurethane, an acrylic based adhesive, a water based adhesive and a solvent-based adhesive.

16. A method for manufacturing a recyclable multilayer packaging material according to claim 1, comprising the steps of:

providing a first polypropylene containing layer, providing a second polypropylene containing layer, providing a third polypropylene containing layer, optionally providing one or more further polypropylene containing layers, where at least two of said layers comprise biaxially oriented polypropylene (BOPP), and adhering the first and the third polypropylene containing layers to the second polypropylene containing layer with two different adhesives.

17. The method according to claim 16, wherein one of the two different adhesives is a polypropylene containing adhesive, preferably a polypropylene resin, which is extruded on a surface of the first polypropylene containing layer.

18. The method according to claim 16, wherein stretching at least one layer, preferably at least two layers biaxially to obtain layers of biaxially oriented polypropylene (BOPP).

19. The method according to claim 16, comprising forming a flexible packaging from the recyclable multilayer packaging material, wherein the packaging is preferably selected from a group comprising stick packs, blister packs, sachets, tubes, cans, stand-up-pouches and boxes.

20. A packaged good comprising a recyclable multilayer packaging material as claimed in claim 1, wherein the good is selected from a chemically aggressive product group consisting of a pharmaceutical product, a home & personal care product, an aggressive filling good, a liquid, a base, an acid, an alcohol, ethanol, methanol, a gel, a suspension, a nutrient, a food product, a beverage and toothpaste.

* * * * *